INVENTOR
DAVID F. THOMAS

March 22, 1966  D. F. THOMAS  3,241,628
VEHICLE AUXILIARY HYDRAULIC CREEPER DRIVE
Filed Aug. 14, 1962  3 Sheets-Sheet 2

INVENTOR
DAVID F. THOMAS
BY Robert M. Dunning
ATTORNEY

March 22, 1966  D. F. THOMAS  3,241,628
VEHICLE AUXILIARY HYDRAULIC CREEPER DRIVE
Filed Aug. 14, 1962  3 Sheets-Sheet 3

INVENTOR
DAVID F. THOMAS

BY *Robert M. Dunning*

ATTORNEY

United States Patent Office 3,241,628
Patented Mar. 22, 1966

3,241,628
VEHICLE AUXILIARY HYDRAULIC CREEPER DRIVE
David F. Thomas, St. Paul, Minn., assignor to Waterous Company, St. Paul, Minn., a corporation of Minnesota
Filed Aug. 14, 1962, Ser. No. 216,900
8 Claims. (Cl. 180—53)

This invention relates to an improvement in auxiliary hydraulic drive for vehicles and deals particularly with an auxiliary drive unit capable of driving the vehicle forwardly or rearwardly at a desired rate of speed independently of the speed of the vehicle motor.

Split-shaft power take-off units are normally mounted between the drive from the engine and transmission of the vehicle, and the drive to the rear axle of the vehicle. A shifting means is employed for either connecting the drive from the engine and transmission to the rear axle, or from the engine and transmission to the power take-off. As a result, the vehicle remains stationary while the power take-off is in operation, and the power take-off cannot be used while the vehicle is in motion. Many times it is desirable to be able to move the truck or similar vehicle while the auxiliary machinery is in use. This is particularly true on trucks used in public utility work where the power take-off is often used to drive hydraulic pumps which furnish power for driving all sorts of auxiliary machinery. It is an object of the present invention to provide a power take-off unit which may both serve to supply hydraulic power to the various auxiliary machinery, and also to provide a means of driving the vehicle in a desired direction and at a desired speed simultaneously.

In a power take-off of the split shaft type, either the power take-off or drive wheels of the vehicle are driven by the vehicle engine through the transmission. Thus if a means were produced for coupling the power take-off and the drive to the rear axle, it would be impractical or at least extremely limited in its use, as the vehicle could be driven in one direction only, while the power take-off was driven, and as the speed of the vehicle and power take-off shaft would be directly related. It is a feature of the present invention that with the attachment it is possible to move the truck with infinitely variable speed in either direction regardless of engine speed, except, of course, that the engine speed must be sufficient to develop enough pressure in the hydraulic system to provide torque to move the truck.

A feature of the present invention resides in the provision of a split-shaft power take-off unit operable, when engaged, to drive a hydraulic pump which may be used to drive various hydraulically operable machinery which may be mounted on the truck, and which may also drive a hydraulic motor connected by suitable gearing to the drive shaft leading to the rear axle of the truck. The hydraulic line leading from the pump to the hydraulic motor includes a metering valve adapted to regulate the speed of flow of fluid through the line, thus regulating the speed of the motor. A directional valve is also provided in the line regulating the direction of flow of the fluid to the hydraulic motor. As a result, the truck may be moved in either direction at a desired speed at the same time, the auxiliary machinery on the truck is being actuated.

A feature of the present invention resides in the provision of an auxiliary drive unit interposed between the power take-off unit and the drive to the rear axle of the vehicle. When the power take-off is not in use, the power is transmitted from the transmission directly through the auxiliary drive unit and to the rear axle. When the power take-off is connected, the auxiliary drive unit is automatically disconnected from the transmission, and this unit may be driven by a hydraulic motor which is reversible and variable in speed.

These and other objects and novel features of the present invention will be more clearly and fully set forth in the following specification and claims.

In the drawings forming a part of the specification;

Figure 1:
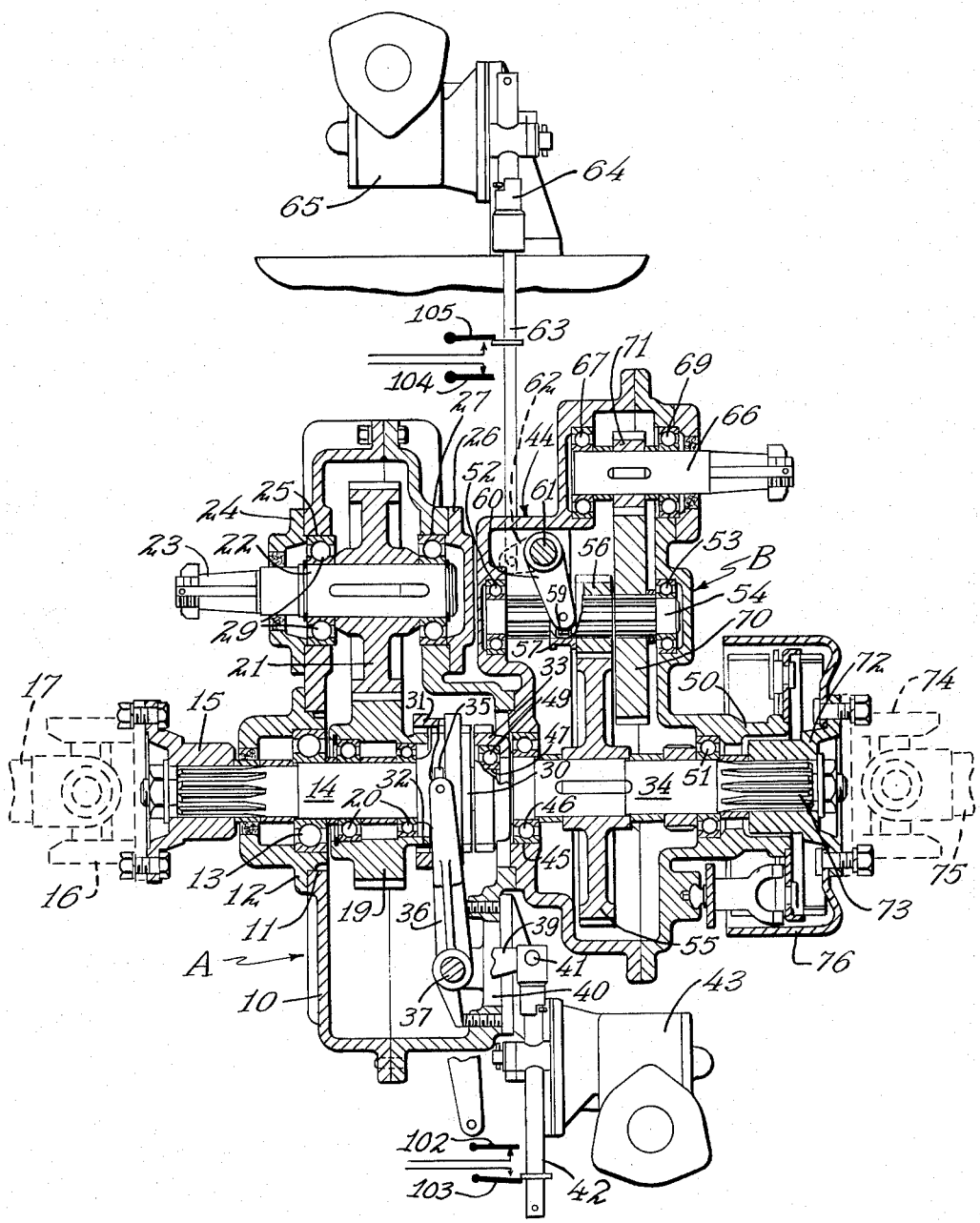
FIGURE 1 is a sectional view through a power take-off and an auxiliary drive unit showing the general arrangement of parts therein.
Figure 2:
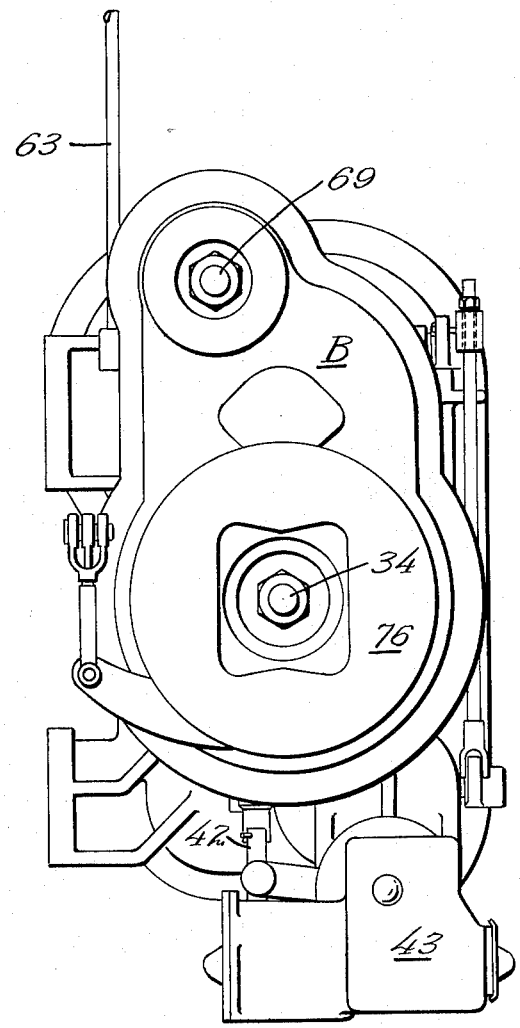
FIGURE 2 is an end elevational view of the apparatus illustrated in FIGURE 1.

FIGURE 1 of the drawings discloses a split-shaft power take-off for vehicles which is indicated in general by the letter A and which has been commercially produced for some time. The figure also illustrates an auxiliary drive unit which is a new feature of the present invention and which is indicated in general by the letter B. The unit A is connected in a manner which will be later described to the vehicle engine E through a suitable transmission. The unit B is connected in a manner which will be later described to the rear axle or drive axle F of the vehicle.

The power take-off unit A includes a housing 10, having an aperture 11 in one side thereof which supports a removable cap plate 12 secured to the housing by bolts or other suitable means not illustrated in the drawings. The cap plate 12 supports a bearing 13 which rotatably supports a drive shaft 14. The drive shaft 14 extends through the cap plate 12. A coupling 15 is splined to the shaft 14 externally of the housing. A universal joint 16 indicated in dotted outline is connected to the coupling 15, and serves to connect the coupling 15 and shaft 14 to the drive shaft 17 leading from the transmission, not illustrated in the drawings.

A gear 19 encircles the drive shaft 14, and is freely rotatable about the shaft, being supported on bearings 20. The gear 19 is in constant mesh with a power take-off gear 21 mounted on the parallel power take-off shaft 22. The shaft 22 has an end 23 which extends through a cap plate 24 attached to the housing in axial alignment with the housing aperture 25. The other end of the shaft 22 terminates within a second cap plate 26 which is secured to the opposite side of the housing from the cap plate 24 and which serves as a closure for the housing aperture 27 concentric with the aperture 25. Bearings 29 are provided between the housing and the shaft 22 to support the shaft which is driven by the gear 21.

The shaft 14 is provided with an enlarged diameter portion 30 which is externally splined and which slidably supports an internally splined clutch sleeve 31. The clutch sleeve 31 is selectively engageable and disengageable with a toothed or splined member 32 on the hub of the gear 19 and functions, when engaged therewith, to drive the gear 19 in unison with the shaft 14. The clutch sleeve 31 is also selectively engageable with the splined end 33 of a shaft 34 coaxial with the shaft 14. As will be later pointed out, the shaft 34 is connected in a suitable manner with the vehicle drive axle. Thus by operation of the clutch sleeve 31, the drive shaft 14 driven by the engine transmission may be either connected directly through to the coaxial shaft 34 and the rear vehicle wheels, or may be connected to the gear 19 to drive the power take-off shaft 23.

The clutch sleeve 31 is externally grooved to accommodate the shifting slides 35 mounted on a clutch yoke 36 supported by a pivot shaft 37. A shift arm 39, which is shown fragmentarily in FIGURE 1, extends through an aperture 40 in the wall of the housing 10 and is pivotally connected at 41 to a mechanism 42 driven by an electrically operated shifter 43. By operating the shifter 43 in one direction or another, the shifting yoke 36 may be pivoted about its axis 37 to move the clutch sleeve 31 into position to either drive the vehicle wheels or to drive the power take-off shaft.

The auxiliary drive unit B includes a housing 44 which is secured to the housing 10 in place of the bearing cap or closure plate which would normally encircle the end of a driven shaft such as 34. A wall of the housing is apertured as indicated at 45 to accommodate a bearing 46 forming a support for an end of the driven shaft 34. The enlarged splined end 33 of the shaft 34 is provided with an axial socket 47 to accommodate a bearing 49 encircling the end of the drive shaft 14, thus holding the two shafts in axial alignment. The housing 44 is provided with a sleevelike extension 50 concentric with the shaft 34 and through which this shaft extends. A bearing 51 is interposed between the shaft 34 and the sleeve 50 to further support the shaft 34.

The housing 44 also provides a support for a pair of coaxial bearings 52 and 53 which support a counter shaft 54 parallel to the driven shaft 34. A gear 55 is keyed or otherwise secured to the shaft 34 and is engageable with a gear 56 slidably splined to the shaft 54. The gear 56 is provided with an integral externally grooved shifting collar 57 which accommodates the shifting shoes 59 on a yoke or parallel arms 60 pivotally supported on the pivot 61. An arm 62 is provided on the pivot 61 and the arm 62 is pivotally connected to the end of a rod 63 forming a part of the linkage 64 connecting the shifting arm with the electrically operated shifter 65. By operation of the shifter 65 in one direction or the other, the gear 56 may be moved axially of the shaft 54 to be engageable with or disengageable from the gear 55.

One of the advantages of this arrangement lies in the fact that the lower portion of the housing 44 normally contains lubricating oil, and the gear 55 constantly rotates in this oil, causing oil to be splashed to the various gears within the auxiliary drive unit.

An additional shaft 66 is supported in parallel relation with the previously described shafts by bearings 67 and 69 supported by the housing 44. A gear 70 is carried by the splined shaft 54, and is in constant mesh with a pinion 71 on the shaft 66. Thus it will be seen that the rotation of the shaft 66 may act through the intermeshing gears 70, 71 and 55, 56 when these latter gears are in mesh to drive the shafts 34.

A coupling 72 is mounted upon the splined end 73 of the driven shaft 34. A universal joint 74 is driven by the coupling 72 and serves to drive the propeller shaft 75 connecting the unit B to drive axle of the vehicle (not illustrated) through a suitable differential. A brake drum 76 may also be connected to the coupling 72 to serve as a parking brake drum for the vehicle.

Figures 4, 5:
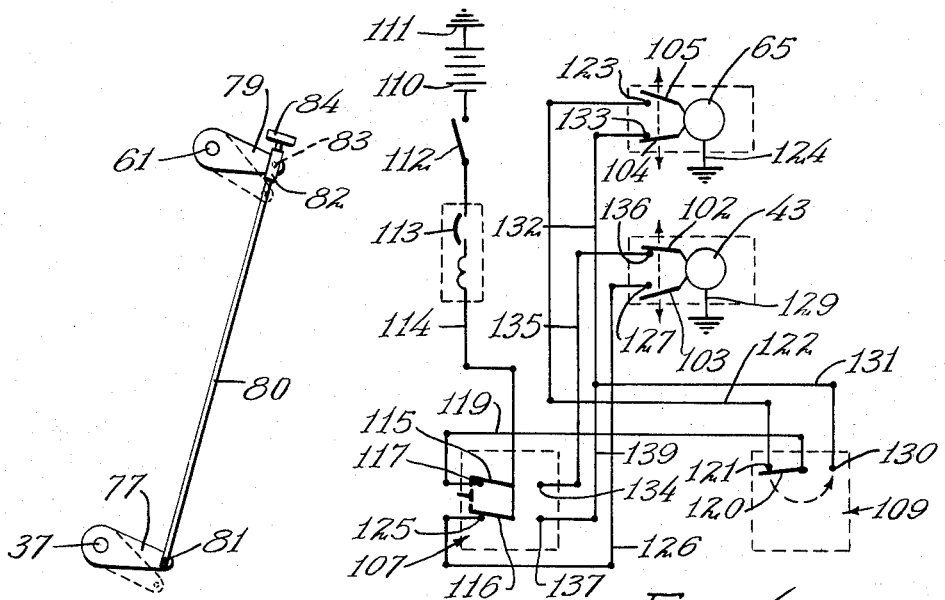
FIGURE 4 is a wiring diagram showing the electrical circuit.
FIGURE 5 illustrates diagrammatically a mechanical shift interlock used in conjunction with the device.

With reference now to FIGURE 5 of the drawings, a mechanical interlock is diagrammatically illustrated which may be used to insure the disengagement of the auxiliary drive unit when the shift collar 31 is directly connecting the shafts 14 and 34. The parallel pivots 37 and 61 which support the shifting forks for the clutch collars 31 and 57 are provided with arms 77 and 79, respectively. A connecting rod 80 is pivotally connected to one arm 77 at 81, and the arm 80 slides through a swivel block 82 pivotally supported on the arm 79 at 83. An adjustable head 84 is provided on the end of the arm 80. With this arrangement, the pivot 37 which controls the shifting fork for the power take-off clutch 31 may be moved to engage the drive shaft 14 with the driven shaft 34, or with the power take-off shaft 22. However, the arm 79 controlling the auxiliary drive unit clutch 57 cannot be shifted from the disengaged position represented by the dotted line position in the FIGURE 5 to the engaged position shown in full lines in this figure while the clutch 31 is in position engaging the shafts 14 and 34, represented by the dotted position in FIGURE 5. Similarly, the power take-off clutch cannot be shifted from the position in which the power take-off is engaged as indicated in full lines to the position in which the drive and driven shafts are connected without simultaneously disengaging the auxiliary drive unit clutch.

Figure 3:
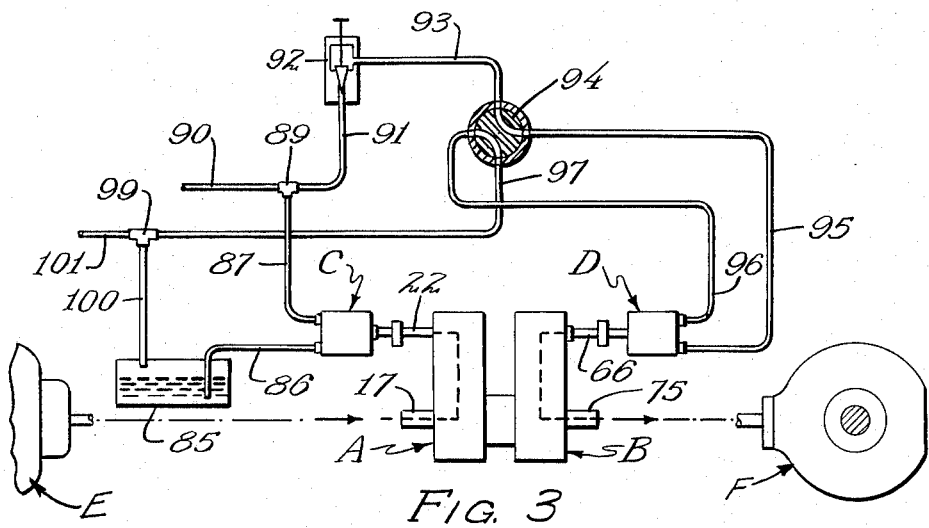
FIGURE 3 is a diagrammatic view of the hydraulic control circuit employed with the apparatus.

The manner in which the apparatus is used is diagrammatically illustrated in FIGURE 3 of the drawings. The power take-off unit A and the auxiliary drive unit B are shown in side by side relation, and the power shaft 17 and driven shaft 75 are shown extending from opposite sides of these units. A pump C is illustrated mounted upon the power take-off shaft 22 and driven thereby. A hydraulic motor D is shown connected to the auxiliary drive shaft 66 for rotating this shaft.

When the power take-off A is in operation, fluid may be drawn from a reservoir 85 through a conduit 86 by the pump C. The discharge from the pump C is forced through the pressure line 87 to a T connection 89 connected to a pressure line 90 which supplies fluid under pressure to the various apparatus on the vehicle which is operated by hydraulic pressure. The T connection 89 also connects with a pressure line 91 leading to a metering valve 92 which may regulate the speed of flow of the fluid under pressure to the pressure line 93 connected to the reversing valve 94. When in the position illustrated, the fluid under pressure flows through the pressure line 95 to the hydraulic motor D. This motor D, being connected to the auxiliary drive unit shaft 66 causes rotation of this shaft. The rotative force is transmitted through the gears 70, 71 and 55, 56 to rotate the driven shaft 34 in one direction. As a result, the vehicle moves at a speed controlled by the metering valve 92 and in a direction controlled by the reversing valve 94.

The fluid leaving the motor D flows through the conduit 96 to the valve 94, and is directed to the exhaust line 97 which is connected through a T connection 99 to the return pipe 100 leading to the reservoir 85. The conduit 101 comprises a return line from the various other hydraulically operated devices on the truck.

As will be evident from the drawings, rotation of the reversing valve 94 through ninety degrees will act to connect the pressure line 93 with the conduit 96 so that pressure will be introduced in an opposite direction into the hydraulic motor D. This causes a reverse rotation of the hydraulic motor and accordingly a reverse movement of the vehicle. Simultaneously the conduit 95 is connected to the exhaust conduit 97 leading through the T connection 99 and drain connection 100 to the reservoir 85.

The circuit for controlling the apparatus is shown diagrammatically in FIGURE 4 of the drawings. For the purpose of explanation, it should be noted that the shifters 43 and 65 are similar, and when a circuit is closed, the motor of the shifter operates to move the connecting mechanism through a predetermined distance at which time a limit switch opens the circuit. The limit switches are shown diagrammatically in conjunction with the shifters 43 and 65, the switches 102 and 103 controlling the circuit to the PTO shifter, and the switches 104 and 105 controlling the circuit to the auxiliary unit shifter 65.

When the two limit switches 102 and 103 are in their upper position, the PTO shifter has shifted the power take-off clutch in order to disconnect the power take-off and to connect the shaft from the transmission directly to the shaft leading to the rear axle. When the two switches are in their lowermost positions as illustrated in the drawing, the PTO shifter has shifted the clutch to disengage the shaft from the rear wheels, and to engage the power take-off shaft. The circuit also includes a double pole double throw PTO control switch illustrated in general by the numeral 107, and a single pole double through auxiliary unit control switch 109. Current to the circuit is from a battery 110 or other current source, one side of which is grounded at 111. The circuit normally leads through an ignition switch 112 and a circuit breaker 113 through the conductor 114 to the contact blades 115 and 116, forming a part of the PTO control switch 107. The switch blade 115 is in engagement with a contact 117 connected by a conductor 119 to the switch blade 120 of the auxiliary unit control switch 109. In the position illustrated, the switch blade 120 is in engagement with a contact 121 connected by conductor 122 to a contact 123 which is engageable with the switch blade 105. The closing of this circuit during a previous operation of the shifter 65 has already closed the contact with the shifter 65, the other terminal of which is grounded as indicated at 124, and the auxiliary unit shifter has shifted the auxiliary unit into engaged position and opened the limit switch blade 105.

The switch blade 116 of the PTO control switch 107 is in engagement with a switch contact 125 connected by conductor 126 to a contact 127 which may be engaged with the limit switch blade 103. When in the position shown in FIGURE 4, a previous action has closed the circuit through the limit switch blade 103 to a ground at 129, and has actuated the PTO shifter to engage the power take-off shaft with the drive shaft from the transmission and has then broken the circuit through the limit switch blade 103.

If the auxiliary unit control switch 109 is turned to its off position, it engages a contact 130 which is connected by a conductor 131 and a conductor 132 to a contact 133 which is in engagement with the limit switch blade 104. This closes the circuit to the shifter 65, and actuates the motor of the shifter through a predetermined distance to disengage the auxiliary power unit, at the end of each actuation the position of the limit switch blades 104, 105 is reversed, the lower limit switch blade 104 being disengaged from the contact 133, and the switch blade 105 being engaged with its contact 123.

In the event it is desired to disconnect the power take-off and to connect the transmission shaft to the rear axle, the PTO Control Switch 107 is reversed in its position. The switch blade 115 then engages the contact 134 which is connected by the conductor 135 to the contact 136 which is in engagement with the switch blade 102 thereby closing a circuit to the shifter 43 which disengages the power take-off and engages the transmission shaft with the rear axle shaft. When this is accomplished, the position of the switch blades 102 and 103 is reversed, the contact between the blade 102 and contact 136 being broken, and the circuit from the blade 103 to the contact 127 being closed.

The switch blade 116 is also engaged with the contact 137 which is connected by the conductor 139 to the previously described conductor 132 connected to the contact 133. The contact 133 is connected by blade 104 to the shifter 65 which is grounded at 124. Thus if the position of the auxiliary unit shifter has not previously been disengaged by operation of the auxiliary unit control switch 109, the auxiliary unit shifter 65 is also moved to disengaged position, resulting in disengagement of the gears 55, 56.

It will be noted that the electrical circuit described automatically disengages the auxiliary drive unit as the power take-off clutch is being moved into position to drive the vehicle wheels. Thus the electrical circuit serves the same purpose as the mechanical interlock illustrated in FIGURE 5, and the mechanical interlock may serve only as a safeguard in case the auxiliary power unit shifter does not function properly.

The operation of the apparatus is believed evident from the foregoing description. When the power take-off is in operation, all direct connection between the vehicle wheels and the vehicle engine is broken. If it is desired to move the vehicle while the power take-off shaft is connected, this may be accomplished by engaging the auxiliary drive clutch. The fluid will be forced from the pump C to the hydraulic motor D, the speed of flow being controlled by the metering valve 92, and the direction of flow being controlled by the reversing valve 94. The hydraulic motor operates through the gear train in the auxiliary power unit to drive the driven shaft 34 and accordingly the rear axle of the truck.

In accordance with the patent statutes, the principles of construction and operation of this improvement in auxiliary hydraulic drive have been described, and while an endeavor has been made to set forth the best embodiment thereof, it should be understood that changes may be made within the scope of the following claims without departing from the spirit of the invention.

What is claimed as new is:
1. A drive for an engine driven vehicle including
    a drive shaft connected to the engine,
    a driven shaft connected to the vehicle axle and coaxially aligned with said drive shaft,
    a power take-off unit,
    a clutch coaxial with said shafts and selectively connecting the drive shaft to either the driven shaft or the power take-off unit,
    an auxiliary drive unit,
    a second clutch selectively connecting or disconnecting said auxiliary drive unit to said driven shaft when, and only when, said first named clutch is connecting said drive shaft to said power take-off unit,
    a hydraulic pump connected to said power take-off unit for actuation thereby,
    a hydraulic motor connected to said auxiliary drive unit and connected to said pump for actuation thereby,
    said auxiliary drive unit being operable to drive said driven shaft when said second clutch is engaged.
2. The structure of claim 1 and including electrically operated shifters for shifting said first and second clutches, and including means controlling said shifters to permit said second clutch to engage said auxiliary drive unit to said driven shaft only when said first clutch is connecting said drive shaft to said power take-off unit.
3. An auxiliary drive unit for use in conjunction with a vehicle having an engine, a drive shaft connected thereto for actuation thereby, a drive axle, a driven shaft coaxially aligned with said drive shaft and connected to said drive axle to activate the same, a power take-off unit including a power take-off shaft, and a first clutch coaxial with said drive shaft and driven shaft and selectively connecting said drive shaft either with said driven shaft or with said power take-off to drive said power take-off shaft, the auxiliary drive unit including,
    an auxiliary drive shaft,
    a second clutch for selectively engaging or disengaging said auxiliary drive shaft and said driven shaft when, and only when, said first clutch is connecting said drive shaft to said power take-off unit, a hydraulic pump connected to said power take-off shaft,
    a hydraulic motor connected to said auxiliary drive shaft for driving the same, and
    connecting means connecting said pump with said hydraulic motor whereby said motor may be driven by said pump.
4. The structure of claim 3 and including a metering valve in said connecting means for regulating the flow of fluid therethrough.
5. The structure of claim 3 and including a reversing valve in said connecting means for controlling the direction of rotation of said hydraulic motor, and a metering valve in said connecting means for regulating the flow of fluid to said hydraulic motor in either direction of rotation.

6. An auxiliary drive unit for use in conjunction with a vehicle having an engine, a drive shaft connected thereto for actuation thereby, a drive axle, a driven shaft connected to said drive axle to actuate the same, a power take-off unit including a power take-off shaft, and a first clutch selectively connecting said drive shaft either with said driven shaft or with said power take-off unit to drive said power take-off shaft, the auxiliary drive unit including,
    an auxiliary drive shaft,
    a second clutch for selectively engaging or disengaging said auxiliary drive shaft and said driven shaft when, and only when, said first clutch is connecting said drive shaft to said power take-off unit,
    a hydraulic pump connected to said power take-off shaft,
    a hydraulic motor connected to said auxiliary drive shaft for driving the same,
    A fluid circuit connecting said pump and said hydraulic motor whereby fluid from said pump may rotate said fluid motor.

7. The structure of claim 6 and in which said fluid circuit includes a metering valve for controlling the rate of flow therethrough.

8. An auxiliary drive unit for use in conjunction with a vehicle having an engine, a drive shaft connected thereto for actuation thereby, a drive axle, a driven shaft connected to said drive axle to actuate the same, a power take-off unit including a power take-off shaft, and a first clutch selectively connecting said drive shaft either with said driven shaft or with said power take-off to drive said power take-off shaft, the auxiliary drive unit including,
    a housing encircling said driven shaft and rotatably supporting the same,
    a gear on said driven shaft within said housing,
    a counter shaft supported by said housing in parallel relation to said driven shaft,
    a gear splined to and slidable on said counter shaft and slidable into or out of engagement with said first named gear,
    means engaging said slidable gear to control the position thereof,
    a second gear on said counter shaft,
    an auxiliary drive shaft supported by said housing in parallel relation to said driven shaft,
    a gear on said auxiliary drive shaft engaged with said second gear on said counter shaft, and
    interconnecting means connecting said first and second clutches, whereby when said first clutch is shifted to connect said drive shaft to said driven shaft, said second clutch must also disengage.

References Cited by the Examiner

UNITED STATES PATENTS

| | | |
|---|---|---|
| 2,084,887 | 6/1937 | Bennett. |
| 2,263,779 | 11/1941 | Jeffrey et al. |
| 2,594,666 | 4/1952 | Long. |
| 2,641,070 | 6/1953 | Bennett. |
| 2,661,634 | 12/1953 | Bechman. |
| 2,708,800 | 5/1955 | Logus _____ 180—53 X |
| 2,829,724 | 4/1958 | Burns et al. _____ 180—53 |
| 2,987,134 | 6/1961 | Myers _____ 180—53 |

FOREIGN PATENTS

| | | |
|---|---|---|
| 543,319 | 7/1957 | Canada. |

A. HARRY LEVY, *Primary Examiner.*